US012769449B2

(12) United States Patent
Lan et al.

(10) Patent No.: US 12,769,449 B2
(45) Date of Patent: Oct. 20, 2026

(54) HIGH-PERFORMANCE FLASH CONTROLLER, AND EMBEDDED SYSTEM

(71) Applicant: GUANGZHOU ANYKA MICROELECTRONICS CO., LTD., Guangzhou (CN)

(72) Inventors: Tiantian Lan, Guangzhou (CN); Runfeng Li, Guangzhou (CN); Ruirui He, Guangzhou (CN)

(73) Assignee: GUANGZHOU ANYKA MICROELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 19/142,492

(22) PCT Filed: Apr. 7, 2024

(86) PCT No.: PCT/CN2024/086420

§ 371 (c)(1),
(2) Date: Jun. 23, 2025

(87) PCT Pub. No.: WO2025/025660

PCT Pub. Date: Feb. 6, 2025

(65) Prior Publication Data

US 2026/0119039 A1 Apr. 30, 2026

(30) Foreign Application Priority Data

Aug. 3, 2023 (CN) ......................... 202310974197.8

(51) Int. Cl.
*G06F 3/06* (2006.01)

(52) U.S. Cl.
CPC .......... *G06F 3/0611* (2013.01); *G06F 3/0658* (2013.01); *G06F 3/0659* (2013.01); *G06F 3/0679* (2013.01)

(58) Field of Classification Search
CPC .... G06F 3/0659; G06F 3/0611; G06F 3/0679; G06F 3/0658
See application file for complete search history.

(56) References Cited

U.S. PATENT DOCUMENTS

| | | | | |
|---|---|---|---|---|
| 11,586,393 | B2 * | 2/2023 | Juan | G06F 3/0632 |
| 11,886,340 | B1 * | 1/2024 | Tong | G06F 9/5016 |

(Continued)

FOREIGN PATENT DOCUMENTS

| | | | |
|---|---|---|---|
| CN | 105190561 | A | 12/2015 |
| CN | 111651384 | A | 9/2020 |

(Continued)

OTHER PUBLICATIONS

PCT International Search Report and Written Opinion (with English translations) for corresponding PCT Application No. PCT/CN2024/086420, mailed Jun. 24, 2024, 12 pages.

(Continued)

*Primary Examiner* — Tracy A Warren
(74) *Attorney, Agent, or Firm* — Dority & Manning, PA

(57) ABSTRACT

In one aspect, a high-performance Flash controller includes a configuration module and a state machine module. The configuration module is configured to: receive shared configuration information and multiple sets of independent configuration information sent by a central processing unit (CPU) corresponding to a target operation, and configure each register in the shared register set according to the shared configuration information, and configure registers in each independent register set according to each set of independent configuration information. The state machine module is configured to: obtain the shared configuration information and the multiple sets of independent configuration information from the configuration module, control the Flash controller to execute the multiple target instructions in sequence to initiate the target operation to a Flash (Continued)

device, and send an interrupt signal to the CPU through the configuration module automatically when an execution of the last target instruction is completed.

19 Claims, 5 Drawing Sheets

(56) References Cited

U.S. PATENT DOCUMENTS

| | | | | |
|---|---|---|---|---|
| 2015/0324198 | A1* | 11/2015 | Alsup | G06F 9/3887 712/233 |
| 2018/0300074 | A1* | 10/2018 | Appu | G06T 1/20 |
| 2022/0206841 | A1* | 6/2022 | Beckmann | G06F 9/30098 |
| 2024/0403059 | A1* | 12/2024 | Li | G06F 9/30038 |

FOREIGN PATENT DOCUMENTS

| | | | |
|---|---|---|---|
| CN | 112752194 | A | 5/2021 |
| CN | 114139476 | A | 3/2022 |
| CN | 114489791 | A | 5/2022 |
| CN | 115858431 | A | 3/2023 |
| CN | 116991764 | A | 11/2023 |
| JP | 2014026679 | A | 2/2014 |
| WO | WO1992007335 | A1 | 4/1992 |
| WO | WO2016202114 | A1 | 12/2016 |
| WO | WO2021244194 | A1 | 12/2021 |

OTHER PUBLICATIONS

Chinese First Office Action (with English Translation) for corresponding Application No. CN202310974197.8, issued Feb. 2, 2024, 11 pages.

Chinese Notification to Grant Patent Right for Invention (with English Translation) for corresponding Application No. CN202310974197.8, issued Feb. 28, 2024, 11 pages.

* cited by examiner

HIGH-PERFORMANCE FLASH CONTROLLER, AND EMBEDDED SYSTEM

RELATED APPLICATIONS

The application is a U.S. National Stage of International Application No. PCT/CN2024/086420, filed on Apr. 7, 2024, which claims priority to Chinese patent application No. 2023109741978, filed on Aug. 3, 2023, and entitled "High-Performance Flash Controller and Embedded System", the entire content of which is hereby incorporated by reference.

TECHNICAL FIELD

The present application relates to the field of integrated circuit technology, and in particular to a high-performance Flash controller and an embedded system.

BACKGROUND

With the development of the information age, the demand for data storage is growing. Flash, as a non-volatile memory, has the advantages of low cost, high data density and small size, and therefore plays an important role in the field of data storage. In order to improve the performance of the system when accessing a Flash device, the problems of the increase of the CPU overhead and the reduction of the system performance of traditional Flash controllers need to be solved urgently.

SUMMARY

Based on this, in order to solve the above technical problems, it is necessary to provide a high-performance Flash controller and an embedded system that can reduce the CPU overhead and improve the system performance.

In a first aspect, the present application provides a Flash controller. The Flash controller includes a configuration module and a state machine module. The configuration module includes a shared register set and multiple independent register sets. The configuration module is configured to: receive shared configuration information and multiple sets of independent configuration information sent by a central processing unit (CPU) corresponding to a target operation, and configure each register in the shared register set according to the shared configuration information, and configure each register in each independent register set according to each set of independent configuration information. The shared configuration information is configuration information shared for executing multiple target instructions related to the target operation, and each set of independent configuration information is configuration information used separately for executing each target instruction. The state machine module is configured to: obtain the shared configuration information and the multiple sets of independent configuration information from the configuration module, and control the Flash controller to execute the multiple target instructions in sequence according to the shared configuration information and the multiple sets of independent configuration information to initiate the target operation to a Flash device, and send an interrupt signal to the CPU through the configuration module automatically when an execution of the last target instruction is completed.

In one of the embodiments, each independent register set includes a transmission interval register. Each set of independent configuration information includes a transmission time interval for configuring the transmission interval register. The transmission time interval is a time interval between the Flash device completing executing a previous target instruction and an issue of a next target instruction. The state machine module is specifically configured to: time the transmission time interval in the transmission interval register corresponding to the execution of the last target instruction after the Flash device completes executing the last target instruction, and determine that the execution of the last target instruction is completed after completing timing and send an interrupt signal to the CPU through the configuration module.

In one of the embodiments, each transmission time interval is a preset maximum instruction execution time duration.

In one of the embodiments, processing phases of the target instruction include an instruction phase, an address phase, a mode bit phase, a null period phase and a data phase. Each independent register set further includes a transmission attribute register, a transmission length register, an instruction register, an address register, a mode bit register and a null period register. The transmission attribute register is configured to start or end each processing phase. The transmission length register is configured to define a length of each processing phase. The instruction register is configured to define each target instruction. The address register is configured to define an address for operating the Flash device. The mode bit register is configured to define a mode bit for operating the Flash device. The null period register is configured to define a quantity of null periods for operating the Flash device.

In one of the embodiments, each independent register set further includes a data register. The Flash controller is configured to write first interactive data in the data register into the Flash device, or write second interactive data read from the Flash device into the data register for storage.

In one of the embodiments, the Flash controller further includes a buffer module. The shared register set includes a CPU transfer register. A working mode of the Flash controller includes a CPU mode. In the CPU mode, the configuration module is configured to write third interactive data, which are sent by the CPU to the CPU transfer register, into the buffer module, and configured to obtain fourth interactive data from the buffer module, which are read from the Flash device, and send the fourth interactive data to the CPU.

In one of the embodiments, the Flash controller further includes a Direct Memory Access (DMA) module connected to an external memory device. The working mode of the Flash controller further includes a DMA mode. In the DMA mode, the DMA module is configured to obtain DMA configuration information related to a DMA operation from the configuration module to initiate the DMA operation based on the DMA configuration information. The DMA operation includes: obtaining fifth interactive data from the buffer module read from the Flash device, and writing the fifth interactive data into the external memory device, or reading sixth interactive data in the external memory device and writing the sixth interactive data into the buffer module.

In one of the embodiments, the Flash controller further includes an Executed in Place (XIP) module. The working mode of the Flash controller further includes an XIP mode. In the XIP mode, the XIP module is configured to receive an XIP request sent by the CPU, and obtain XIP configuration information related to the XIP mode from the configuration module, and process the XIP request based on the XIP configuration information, and obtain seven interactive data from the buffer module read from the Flash device, and return the seven interactive data to the CPU.

In one of the embodiments, the Flash controller further includes a clock control module. The clock control module is configured to, when executing each target instruction, obtain the shared configuration information and independent configuration information corresponding to each target instruction, and generate a clock signal meeting requirements of driving the Flash device based on the shared configuration information and the independent configuration information corresponding to each target instruction.

In one of the embodiments, the Flash controller further includes a buffer module. The state machine module is further configured to generate an extension control signal when a sending buffer space of the buffer module is empty or when a receiving buffer space of the buffer module is full, and send the extension control signal to the clock control module. The clock control module is configured to perform a clock extension processing according to the extension control signal, wherein the clock extension processing refers to keeping a level of a current clock signal unchanged.

In one of the embodiments, the Flash controller further includes a Flash interface control module. The state machine module is specifically configured to, when executing each target instruction, generate a device control signal based on shared configuration information and independent configuration information corresponding to each target instruction, and send the device control signal to the Flash interface control module. The clock control module is configured to send a generated clock signal to the Flash interface control module. The Flash interface control module is configured to control the Flash device and perform data interaction with the Flash device, according to the device control signal and the clock signal and based on timing requirements of the Flash interface.

In a second aspect, the present application further provides an embedded system, including the CPU, a memory device, the Flash device, and any one of the Flash controllers in the first aspect. The Flash controller is connected to the CPU, the memory device and the Flash device.

In the above-mentioned high-performance Flash controller and the embedded system, the Flash controller includes the configuration module and the state machine module. The configuration module includes the shared register set and the multiple independent register sets. The configuration module is configured to: receive the shared configuration information and the multiple sets of independent configuration information corresponding to the target operation sent by the CPU, and configure each register in the shared register set according to the shared configuration information shared by the multiple target instructions related to the execution of the target operation, and configure registers in each independent register set according to each set of independent configuration information used separately for executing the corresponding target instruction. The state machine module is configured to: obtain the shared configuration information and the multiple sets of independent configuration information from the configuration module, and control the Flash controller to execute the target instructions in sequence according to the shared configuration information and the multiple sets of independent configuration information to initiate the target operation to the Flash device, and automatically send the interrupt signal to the CPU through the configuration module when the execution of the last target instruction is completed. In this way, when the CPU instructs the Flash controller to perform the target operation on the Flash device, the configuration information of all target instructions required to implement the target operation can be directly sent to the configuration module at one time. The state machine can send the interrupt signal to the CPU after all target instructions are executed, so that the CPU knows that the execution of the current target operation is completed. In this process, the Flash controller does not need to frequently report interrupt signals to the CPU during the execution of the target operation, that is, the CPU does not need to frequently process interrupt signals. In addition, the CPU does not need to monitor in real time whether the Flash controller has completed the target operation. Instead, the CPU can determine that the execution of the target operation has been completed after receiving the interrupt signal, thereby effectively reducing the CPU overhead and improving the system performance.

BRIEF DESCRIPTION OF THE DRAWINGS

In order to more clearly illustrate the embodiments of the present application or the technical solutions in the conventional technology, the drawings required for describing the embodiments or the conventional technology are briefly described below. Obviously, the drawings described below are merely embodiments of the present application, and for the ordinary skilled in the art, other drawings may be obtained based on the disclosed drawings without any creative work.

DETAILED DESCRIPTION OF THE EMBODIMENTS

The technical solutions in embodiments of the present application will be described clearly and completely by reference to the drawings of the embodiments of the present application. Obviously, the described embodiments are only part of the embodiments, but not all embodiments of the present application. Based on the embodiments in the present application, all other embodiments obtained by the ordinary skilled in the art without creative work are within the scope of protection of this application.

In order to make the objectives, technical solutions and advantages of the present application clear and better understood, the present application is further described in detail below in conjunction with the accompanying drawings and embodiments. It should be understood that the specific embodiments described herein are only configured to explain the present application but not intended to limit the present application.

With the development of the information age, the demand for data storage is growing. Flash, as a non-volatile storage, has the advantages of low cost, high data density and small size, and therefore plays an important role in the field of data storage. In order to improve the performance of the system when accessing a Flash device, it is necessary to optimize the architecture of the traditional Flash controllers.

A combination of multiple different instructions is needed for a Flash device to execute a programming operation or a configuration operation. In a working mode of traditional Flash controller, the Flash controller needs to configure a CPU multiple times and interrupt a CPU multiple times, thus increasing the CPU overhead and reducing the system performance. In addition, in the working mode of traditional Flash controller, the CPU needs to internally time or periodically monitor status bits of the Flash device to determine whether an execution of a certain operation on the Flash is completed, which also increases the CPU overhead and reduces the system performance.

In order to solve the problem that the traditional Flash controller needs to frequently report interrupts when performing operations involving a combination of multiple different instructions, a high-performance Flash controller is provided in an embodiment of the present application, and the high-performance Flash controller introduces a "single-configuration-and-multiple-transmission" mechanism to avoid increasing the CPU overhead and reducing system performance due to this problem. In addition, the Flash controller provided in the embodiment of the present application also introduces a "post-transmission auto-timing" mechanism, thereby avoiding the increase of the CPU overhead caused by the CPU determining whether an execution of a certain operation on the Flash is completed by means of internally timing or periodically monitoring the status bits of the Flash.

The Flash controllers provided in the embodiments of the present application are described below.

Figure 1:
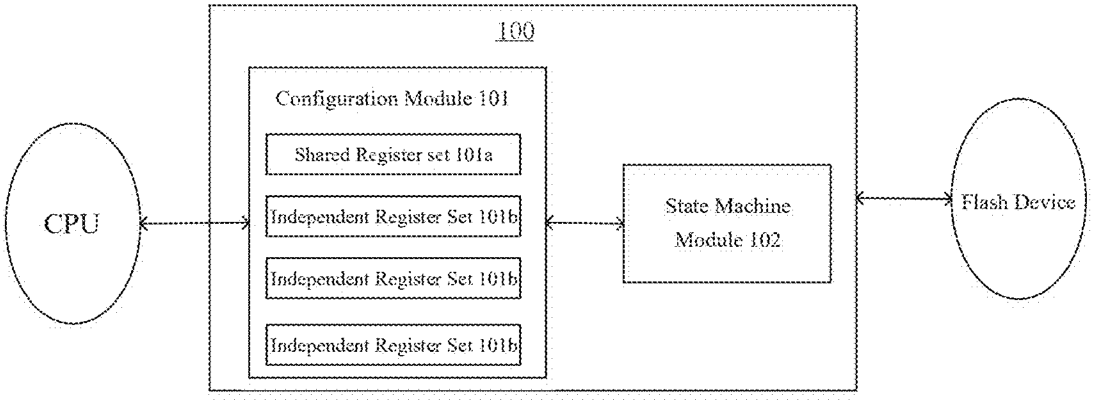
FIG. 1 is a schematic view showing a structure of a Flash controller according to an embodiment.

In an embodiment, as shown in FIG. 1, a schematic view showing a structure of a Flash controller according to an embodiment of the present application, the Flash controller 100 includes a configuration module 101 and a state machine module 102. The configuration module includes a shared register set 101*a* and multiple independent register sets 101*b*. The configuration module 101 is configured to: receive shared configuration information and multiple sets of independent configuration information sent by the CPU corresponding to a target operation, and configure each register in the shared register set 101*a* according to the shared configuration information, and configure each register in each independent register set 101*b* according to each set of independent configuration information. The shared configuration information is the configuration information shared for executing multiple target instructions related to the target operation, and each set of independent configuration information is the configuration information used separately for executing each target instruction. The state machine module 102 is configured to: obtain the shared configuration information and the multiple sets of independent configuration information from the configuration module 101, and control the Flash controller 100 to execute target instructions in sequence according to the shared configuration information and the multiple sets of independent configuration information to initiate the target operation to the Flash device, and send an interrupt signal to the CPU through the configuration module 101 automatically when the execution of the last target instruction is completed.

The Flash device, also named a Flash memory, is a kind of memory device, and is a non-volatile memory.

The target operation refers to an operation for the Flash device, and for example, it is a read operation, a write operation, an erase operation, or a programming operation, etc. for the Flash device, which is not specifically limited herein. Optionally, the target operation is an operation implemented by a combination of multiple instructions. For example, in order to perform the erase operation on the Flash device, it is necessary to execute a write enable instruction and an erase instruction. Then, it can be understood that, exemplarily, if the target operation is the erase operation, the multiple target instructions related to the target operation are the write enable instruction and the erase instruction.

When the CPU instructs the Flash controller 100 to perform the target operation on the Flash device, the CPU sends the shared configuration information and the multiple sets of independent configuration information which are corresponding to the target operation to the Flash controller 100. Each target instruction corresponds to a set of independent configuration information.

To implement the target operation, the target instructions need to be executed in sequence. For the target instructions, there may be some common configuration information used for executing the target instructions, and the shared configuration information is the common configuration information.

The shared configuration information includes configuration data corresponding to each register in the shared register set 101*a*. Therefore, the configuration module 101 may write the configuration data corresponding to each register in the shared register set 101*a* into each corresponding register.

In addition, some configuration information corresponding to each target instruction is required when executing each target instruction, that is, one set of independent configuration information corresponding to one target instruction is required. One independent register set 101*b* corresponds to one target instruction. Therefore, after receiving each set of independent configuration information, the configuration module 101 writes each set of independent configuration information into a corresponding independent register set 101*b*. Similarly, a set of independent configuration information includes configuration data corresponding to each register in one independent register set 101*b*. Therefore, for each independent register set 101*b*, the configuration module 101 writes configuration data corresponding to each register in the corresponding independent register set 101*b* into the corresponding register.

The state machine module 102 is connected to the configuration module 101, for example, through a communication connection or a wire connection.

Optionally, during the execution of the first target instruction, the configuration module 101 may read the shared configuration information and the independent configuration information corresponding to the target instruction from the registers and send them to the state machine module 102. Based on the received configuration information, the state machine module 102 synchronously controls other modules in the Flash controller 100 to work, so that the Flash controller 100 initiates the execution of the first target instruction to the Flash device through coordinated operations of modules. When determining that the Flash device has finished the execution of the first target instruction, the state machine module 102 reports a completion signal to the configuration module 101, and then configuration module 101 may read the shared configuration information and the independent configuration information corresponding to the second target instruction and send them to the state machine module 102. Based on the received configuration information, the state machine module 102 synchronously controls other modules in the Flash controller 100 to work, so that the execution of the second target instruction is initiated to the Flash device. The same process is performed until the execution of the last target instruction is completed, thereby achieving the target operation for the Flash device.

The completion of the execution of the last target instruction means that the Flash device completes the processing of the last target instruction. Optionally, since the Flash device, before executing the next instruction, needs to wait for a period of time after completing the processing of a certain instruction, the completion of the execution of the last target instruction may refer to the moment that, after completing the execution the last target instruction, the Flash device can continue to execute other instructions corresponding to the next operation. In this case, the state machine module 102 reports an interrupt signal to the CPU through the configuration module 101, so that the CPU can determine that the execution of the operation on the Flash is completed without internally timing or periodically monitoring status bits of the Flash device, thereby reducing the CPU overhead.

Optionally, after receiving and configuring the shared configuration information and the independent configuration information, the Flash controller 100 may start to execute the target operation, that is, execute the target instructions in sequence.

Optionally, the configuration module 101 and the state machine module 102 may be implemented by hardware, or by a combination of software and hardware.

It should be noted that FIG. 1 only exemplarily shows three independent register sets 101*b*, and is not intended to limit the present application. There may be multiple independent register sets 101*b*, and a quantity of the independent register sets 101*b* may be configured according to a quantity of target instructions related to the target operation. Optionally, during an execution of the target operation, the independent register sets 101*b* that are not configured may be used for other purposes.

Optionally, the Flash controller 100 also includes other modules, such as an Executed in Place (XIP) module, a Direct Memory Access (DMA) module, a clock control module, a buffer module, a Flash interface control module, etc., which are descripted in detail hereinafter.

The above-mentioned Flash controller includes the configuration module and the state machine module. The configuration module includes the shared register set and the multiple independent register sets. The configuration module is configured to: receive the shared configuration information and the multiple sets of independent configuration information corresponding to the target operation sent by the CPU, and configure each register in the shared register set according to the shared configuration information shared by the multiple target instructions related to the execution of the target operation, and configure each register in each independent register set according to each set of independent configuration information used separately for executing the corresponding target instruction, so as to realize a single-configuration-and-multiple-transmission mechanism. The state machine module is configured to: obtain the shared configuration information and the multiple sets of independent configuration information from the configuration module, and control the Flash controller to execute the target instructions in sequence according to the shared configuration information and the multiple sets of independent configuration information to initiate the target operation to the Flash device, and automatically send the interrupt signal to the CPU through the configuration module when the execution of the last target instruction is completed. In this way, when the CPU instructs the Flash controller to perform the target operation on the Flash device, the configuration information of all target instructions required to implement the target operation can be directly sent to the configuration module at one time. The state machine can send the interrupt signal to the CPU after all target instructions are executed, so that the CPU knows that the execution of the current target operation is completed. In this process, the Flash controller does not need to frequently report interrupt signals to the CPU during the execution of the target operation, that is, the CPU does not need to frequently process interrupt signals. In addition, the CPU does not need to monitor in real time whether the Flash controller has completed the target operation. Instead, the CPU can determine that the execution of the target operation has been completed after receiving the interrupt signal, thereby effectively reducing the CPU overhead and improving the system performance.

In an embodiment, each independent register set 101*b* includes a transmission interval register, and each set of independent configuration information includes a transmission time interval for configuring the transmission interval register. The transmission time interval is a time interval between the Flash device completing executing a previous target instruction and an issue of the next target instruction. The state machine module 102 is specifically configured to: time the transmission time interval in the transmission interval register corresponding to the execution of the last target instruction after the Flash device completes executing the last target instruction, and determine that the execution of last target instruction is completed after completing timing, and send the interrupt signal to the CPU through the configuration module 101.

Each set of independent configuration information corresponding to each independent register set 101*b* includes a transmission time interval, which is the time interval between the Flash device completing executing the previous target instruction and an issue of the next target instruction. The above-mentioned period of time is the transmission time interval for which the Flash device needs to wait after completing the execution of a certain instruction and before executing the next instruction.

Specifically, during the execution of the previous target instruction, when the state machine module 102 controls other modules to work synchronously to initiate the previous target instruction to the Flash device, the state machine module 102 starts timing. When the timing duration reaches the transmission interval time, the state machine module 102 determines that the Flash device has finished processing the previous target instruction and can start processing the next target instruction, and the state machine module 102 may report a completion signal to the configuration module 101 and obtain the configuration signal for the next target instruction, so as to execute the next target instruction. After timing the transmission time interval in the configuration information corresponding to the last target instruction is completed, the interrupt signal may be reported to the configuration module 101, and then the configuration module 101 sends the interrupt signal to the CPU, thereby realizing a post-transmission auto-timing mechanism.

Optionally, the respective transmission time intervals in the independent configuration information corresponding to the target instructions can be different.

In the embodiment of the present application, the transmission interval register in the independent register set is configured to define the time interval for reporting the interrupt signal or initiating the next target instruction after the Flash completes the execution of the previous target instruction, so that the state machine module can automatically report the interrupt signal. Moreover, for one target operation, only one interrupt signal needs to be reported, thereby avoiding the increase of the CPU overhead caused by the CPU periodically monitoring the status bits of the Flash device after an operation is initiated to the Flash. Then, the CPU overhead for other processing in the system can be improved, thereby improving the system performance.

In an optional embodiment, the transmission time interval is a preset maximum instruction execution time duration.

The CPU may set the maximum instruction execution time duration to be the transmission time interval. Optionally, the maximum instruction execution time durations corresponding to different target instructions may be different.

Exemplarily, maximum time durations, required for the Flash device to execute different instructions before it becomes ready for executing respective next instructions, can be monitored in advance to obtain respective maximum instruction execution time durations corresponding to all instructions, and the obtained maximum instruction execution time durations are pre-stored in the CPU. After determining the target instructions related to the target operation, the CPU directly obtains the preset maximum instruction execution time durations corresponding to the target instructions and uses them as the transmission time intervals for configuring the transmission interval register.

By setting the transmission time interval to be the preset maximum instruction execution time duration, redundant time is reserved for the Flash device to process each target instruction, thus ensuring the normal operation of the Flash device.

As can be seen from the above description, in the embodiment of the present application, by configuring the Flash controller at one time, the Flash controller is allowed to continuously issue multiple different instructions to the Flash device and only report the interrupt signal to the CPU once, thereby realizing the "single-configuration-and-multiple-transmission" mechanism, and preventing the Flash controller from interrupting the CPU several times when the Flash controller is carrying out a series of transmissions. In addition, after the Flash controller issues a certain instruction to the Flash device, the state machine module itself automatically times according to the transmission time interval, and reports the interrupt signal after the configured time duration reaches, so that the "post-transmission auto-timing" mechanism is realized, thereby avoiding the increase of the CPU overhead caused by the CPU determining whether an execution of a certain operation on the Flash is completed by means of internally timing or periodically monitoring the status bits of the Flash, and thus improving the system performance.

The processing phases required for the Flash controller 100 to execute a target instruction are described as follows.

Figure 2:
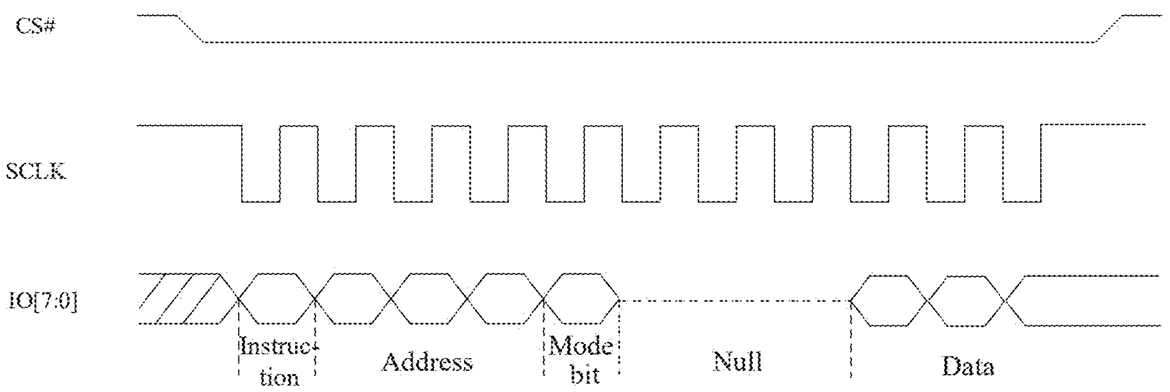
FIG. 2 is a schematic view showing operation timing of processing phases of the target instruction according to an embodiment.

In an embodiment, the processing phases of the target instruction include an instruction phase, an address phase, a mode bit phase, a null period phase and a data phase. The operation timing of all phases is shown in FIG. 2, where CS # denotes a chip select signal, SCLK denotes a clock signal, and IO denotes an input/output signal.

Each independent register set 101*b* includes the transmission interval register, and may further include a transmission attribute register, a transmission length register, an instruction register, an address register, a mode bit register and a null period register. The registers in the corresponding independent register set 101*b* are configured according to the relevant characteristics of the five processing phases of the corresponding target instruction.

The transmission attribute register is configured to start or end each processing phase, that is, starting or ending each processing phase may be determined according to the configuration data of the transmission attribute register. Exemplarily, a bit width of the transmission attribute register may be 17 bits, where Bit 0 corresponds to a transmission direction flag bit, Bit 1 corresponds to a double data rate (DDR) transmission instruction flag bit, Bit 2 corresponds to DDR transmission address/mode bit/null period flag bit, Bit 3 corresponds to DDR transmission data flag bit, Bit 4 corresponds to an instruction phase enable bit, Bit 5 corresponds to an address phase enable bit, Bit 6 corresponds to a mode bit phase enable bit, Bit 7 corresponds to a null period phase enable bit, Bit 8 corresponds to a data phase enable bit, Bit [10:9] corresponds to an instruction phase transfer bit width (1/2/4/8 lines), Bit [12:11] corresponds to a transfer bit width (1/2/4/8 lines) of the address/mode bit/null period phase, Bit [14:13] corresponds to a data phase transfer bit width (1/2/4/8 lines), Bit 15 corresponds to an intermediate medium for data interaction during an operation of the Flash controller, the intermediate medium is, for example, a data register or a buffer module (referring to the description below), and Bit 16 corresponds to a valid flag bit of the independent register set 101*b*.

The transmission length register is configured to define a length of each processing phase. Exemplarily, the bit width of the transmission length register may be 32 bits, where Bit [1:0] corresponds to a target instruction length, Bit [3:2] corresponds to an address length, Bit [5:4] corresponds to a mode bit length, and Bit [31:6] corresponds to a data length.

The instruction register is configured to define each target instruction.

The address register is configured to define an address for operating the Flash device. That is, the address of the Flash device to be operated during the execution of the target instruction.

The mode bit register is configured to define the mode bit for operating the Flash device.

The null period register is configured to define a quantity of null periods for operating the Flash device.

In an embodiment, the status information and configuration information shared by different target instructions are allocated in the shared register set 101*a*. The shared register set 101*a* may include a status register, an interrupt enable register, an operating mode register, a clock configuration register, a DMA transfer register, a CPU transfer register, and a transfer starting register. It may be understood that the configuration information in the shared register set 101*a* is valid for the related operations of target instructions continuously initiated to the Flash device for several times. Exemplarily, the description of each register in the shared register set 101*a* may be seen in Table 1.

TABLE 1

| Register Name | Bit width | Description of Instruction |
|---|---|---|
| Status Register | 4 bits | Bit 0: Sending buffer empty flag bit<br>Bit 1: Receiving buffer full flag bit<br>Bit 2: Transfer completion flag bit<br>Bit 3: Flash interface idle flag bit |
| Interrupt Enable Register | 4 bits | Bit 0: Transmission buffer empty enable bit<br>Bit 1: Receiving buffer full enable bit<br>Bit 2: Transfer completion enable bit<br>Bit 3: Flash interface idle enable bit |
| Working Mode Register | 2 bits | 00: CPU mode<br>01: DMA mode<br>10: XIP mode |
| Clock Mode Register | 11 bits | Bit [9:0]: Baud rate configuration bit<br>Bit 10: Flash interface idle clock level |
| DMA Transfer Register | 60 bits | Bit [31:0]: DMA transfer starting address<br>Bit [59:32]: DMA transfer data amount |
| CPU Transfer Register | 32 bits | Bit [31:0]: Data receiving/sending register in CPU mode |
| Transfer Starting Register | 1 bit | Bit 0: Controller enable flag |

In an embodiment, each independent register set 101*b* further includes a data register. The Flash controller 100 is configured to write the first interactive data in the data register into the Flash device, or write the second interactive data read from the Flash device into the data register for storage.

The Flash controller 100 may further include a buffer module, and the Flash controller 100 may cache data for interacting with the Flash device through the buffer module. The buffer module may include a transmission buffer area and a receiving buffer area to cache data to be written into the Flash device and data read from the Flash device, respectively. Optionally, the buffer module may be connected to the state machine module 102 through a communication connection or a wire connection to receive a control of the state machine module 102 and perform data interaction with the Flash device.

In addition to a data interaction with the Flash device through the buffer module, a data interaction with the Flash device directly through the data register in the independent register set 101*b* is also supported, that is, the interactive data in an interaction with the Flash device is directly from the data register or is directly written to the data register.

Optionally, the amount of interactive data with the Flash device at one time does not exceed 4 bytes.

Optionally, the medium for data interaction may be selected by configuring Bit 15 of the transmission attribute register. For example, when Bit 15 is 1, the intermediate medium for data interaction is the data register, and when Bit 15 is 0, the intermediate medium for data interaction is the buffer module.

In an embodiment of the present application, the storage space of the Flash controller can be expanded by storing data in the data register, thereby improving the flexibility of data interaction between the Flash controller and the Flash device, and avoiding the problem of a data interaction failure caused by the buffer module being full.

Exemplarily, the description of registers in one independent register set 101*b* may be seen in Table 2.

TABLE 2

| Register Name | Bit width | Description of Instruction |
|---|---|---|
| Instruction Register | 32 bits | Bit [31:0]: Instruction for operating Flash |
| Address Register | 32 bits | Bit [31:0]: Address for operating Flash |
| Mode Bit Register | 32 bits | Bit [31:0]: Mode bit for operating Flash |
| Null Period Register | 8 bits | Bit [7:0]: Quantity of null periods for operating Flash |
| Data Register | 32 bits | Bit [31:0]: Register for data interaction with Flash |
| Transmission Length Register | 32 bits | Bit [1:0]: Instruction length, Base 0<br>Bit [3:2]: Address length, Base 0<br>Bit [5:4]: Mode bit length, Base 0<br>Bit [31:6]: Data length, Base 0 |
| Transmission Attribute Register | 17 bits | Bit 0: Transmission direction flag<br>Bit 1: Instruction DDR transmission flag<br>Bit 2: Address/mode bit/null period DDR transmission flag<br>Bit 3: Data DDR transmission flag<br>Bit 4: Instruction phase enable bit<br>Bit 5: Address phase enable bit<br>Bit 6: Mode bit phase enable bit<br>Bit 7: Null period phase enable bit<br>Bit 8: Data phase enable bit<br>Bit [10:9]: Instruction phase transfer bit width (1/2/4/8 lines)<br>Bit [12:11]: Address/mode bit/null cycle transfer bit width (1/2/4/8 lines) |

TABLE 2-continued

| Register Name | Bit width | Description of Instruction |
|---|---|---|
| | | Bit [14:13]: Data transfer bit width (1/2/4/8 lines)<br>Bit 15: Intermediate medium for interactive data in the controller during an operation on the Flash<br>0: Data register<br>1: Buffer module<br>Bit 16: Valid flag bit of an independent register set 101b |
| Transmission Interval Register | 32 bits | Bit [31:0]: Time interval between a completion of an operation on the Flash and the interrupt report or starting the next operation |

Figure 3:
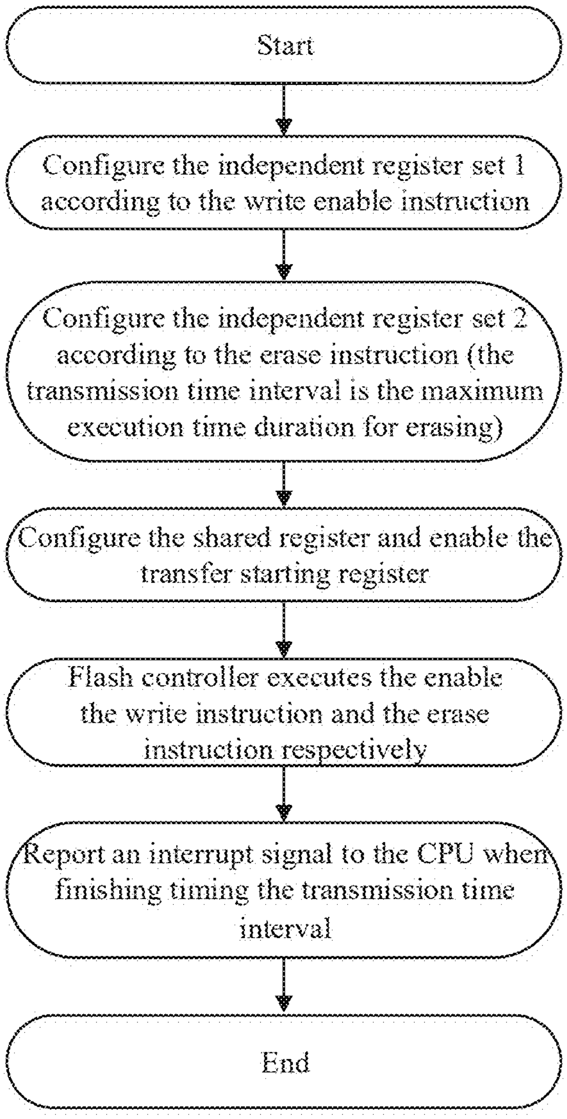
FIG. 3 is a flowchart of a software and hardware interaction when performing an erase operation on a Flash device according to an embodiment.
Figure 4:
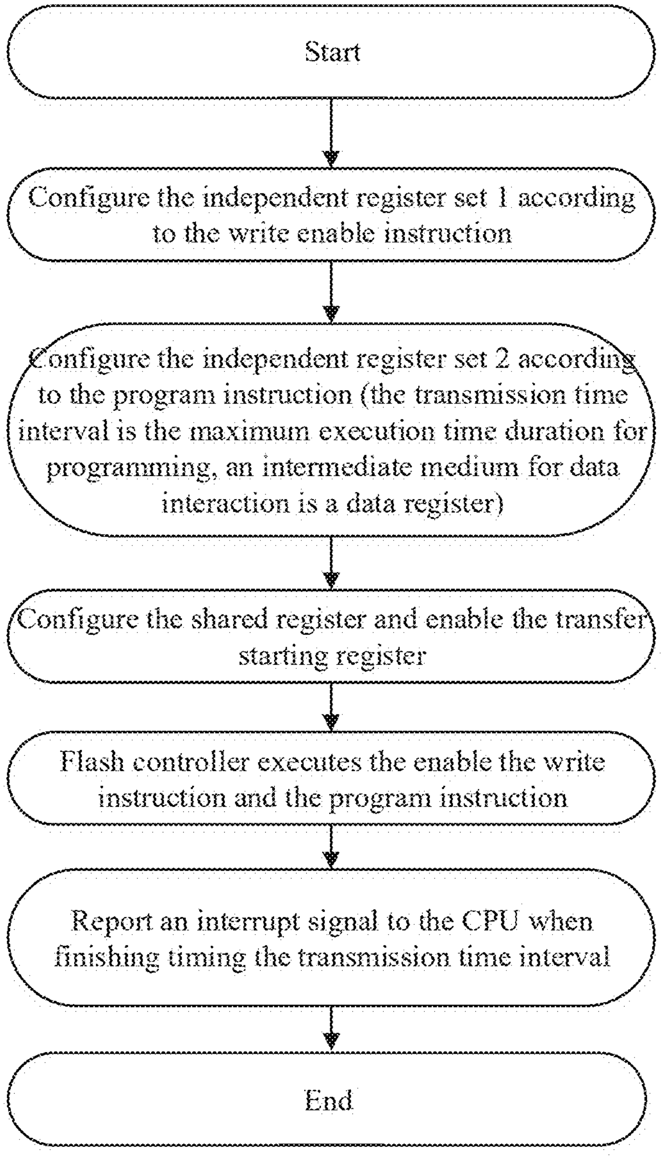
FIG. 4 is a flowchart of a software and hardware interaction when performing a programming operation on the Flash device according to an embodiment.

For the above description, refer to FIG. 3, which shows a flowchart of a software and hardware interaction when performing an erase operation on a Flash device according to an embodiment. Referring to FIG. 4, FIG. 4 shows a flowchart of a software and hardware interaction when performing a programming operation on the Flash device according to an embodiment of the present application.

Figure 5:
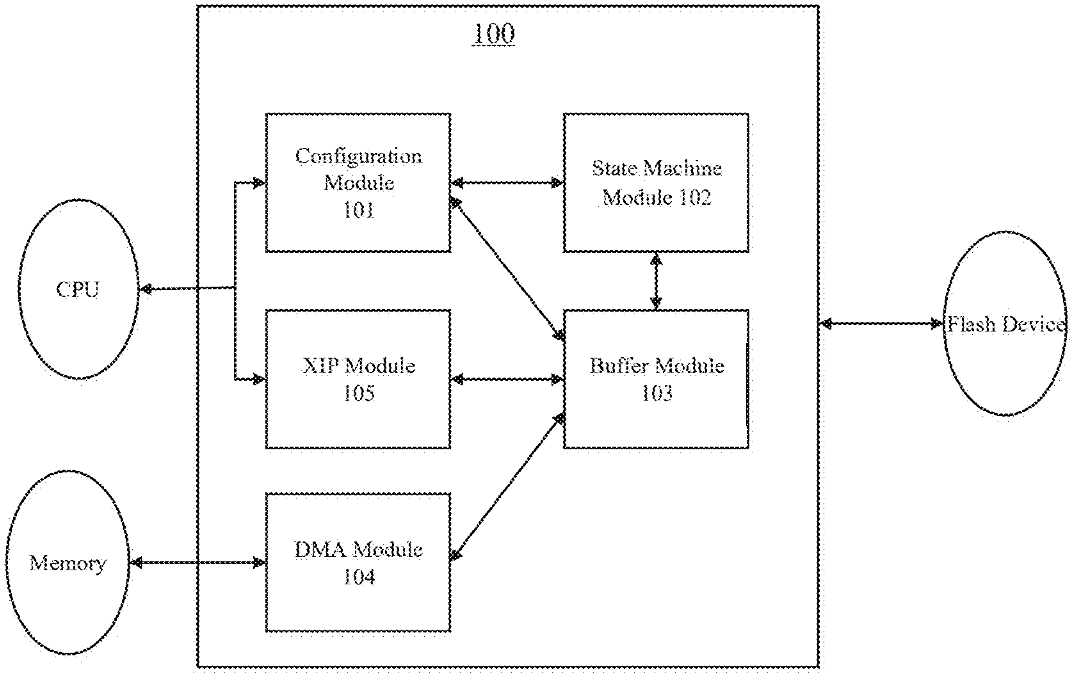
FIG. 5 is a schematic view showing a structure of another Flash controller according to another embodiment.

Referring to FIG. 5, FIG. 5 is a schematic view showing a structure of another Flash controller according to an embodiment of the present application. The Flash controller 100 further includes a buffer module 103, a Direct Memory Access (DMA) module 104 connected to an external memory device, and an Executed in Place (XIP) module 105. In the embodiment of the present application, the working modes of the Flash controller 100 may include a CPU mode, a DMA mode, and an XIP mode. The working process of each mode is described hereinafter.

In an embodiment, in the CPU mode, the configuration module 101 is configured to write third interactive data, which are sent by the CPU to the CPU transfer register, into the buffer module 103, and configured to obtain fourth interactive data from the buffer module 103, which are read from the Flash device, and send them to the CPU.

The CPU mode refers to the CPU realizing a data interaction with the Flash device by means of a corresponding register in the configuration module 101. Specifically, the configuration module 101 writes the data (recorded as the third interactive data), which are sent by the CPU to the CPU transfer register, into the transmission buffer area of the buffer module 103; or, reads the data (recorded as the fourth interactive data), which the CPU needs to receive, from the receiving buffer area of the buffer module 103 by means of the CPU transfer register.

In an embodiment, in the DMA mode, the DMA module 104 is configured to obtain DMA configuration information related to a DMA operation from the configuration module 101, so as to initiate the DMA operation based on the DMA configuration information. The DMA operation includes: obtaining fifth interactive data from the buffer module 103 read from the Flash device, and writing the fifth interactive data into the memory device, or, reading sixth interactive data from the memory device and writing them into the buffer module 103.

Optionally, the DMA module 104 is connected to the external memory device and the buffer module 103 through a communication connection or a wire connection.

The DMA mode refers to the DMA module 104 initiating the DMA operation after receiving the DMA configuration information related to the DMA operation from the configuration module 101, so as to perform the data interaction with the Flash device. Specifically, the DMA module 104 may write the data (recorded as the sixth interactive data) downloaded from the memory device to the transmission buffer area, so as to write them into the Flash device when needed. Alternatively, the DMA module 104 may read the data out from the receiving buffer area, which are read from the Flash device and need to be uploaded to the memory device.

In an embodiment, in the XIP mode, the XIP module 105 is configured to receive an XIP request sent by the CPU and obtain XIP configuration information related to the XIP mode from the configuration module 101, and process the XIP request based on the XIP configuration information, so as to obtain the seven interactive data from the buffer module 103 read from the Flash device, and return the seven interactive data to the CPU.

The XIP module 105 is connected to the CPU, the configuration module 101 and the buffer module 103.

The XIP mode refers to, the XIP module 105, after receiving the XIP configuration information related to the XIP mode from the configuration module 101, processing the XIP request initiated by the CPU, so as to read data from the Flash device. Specifically, the XIP module 105 may parse the XIP request initiated by the CPU and forward it to the state machine module 102, and return data (referred to as the seven interactive data) received from the receiving buffer area to the CPU.

In the embodiment of the present application, the Flash controller may be in different modes, so that the data interaction may be flexibly processed, thereby improving the flexibility of data processing, and facilitating the CPU to store data or obtain data.

In an embodiment, when executing the target instruction, the state machine module 102 can independently control the five phases of operating the Flash device. The state machine module 102 needs to, based on the configuration information of the configuration module 101 related to the five phases above, control the clock control module, the buffer module 103 and the Flash interface control module in the Flash controller 100 to work synchronously. The state machine module 102 mainly includes an idle state, an instruction state, an address state, a mode bit state, a null period state and a data state.

Optionally, the Flash controller 100 supports a 1-line, 2-line, 4-line or 8-line operation on the Flash device, and correspondingly, the state machine module 102 needs to perform a corresponding shift input/output operation according to bit widths of different transmission phases. The state machine module 102 includes a shift register configured for performing a shift operation on data in each processing phase.

The working processes of the clock control module and the Flash interface control module are described hereinafter.

Figure 6:
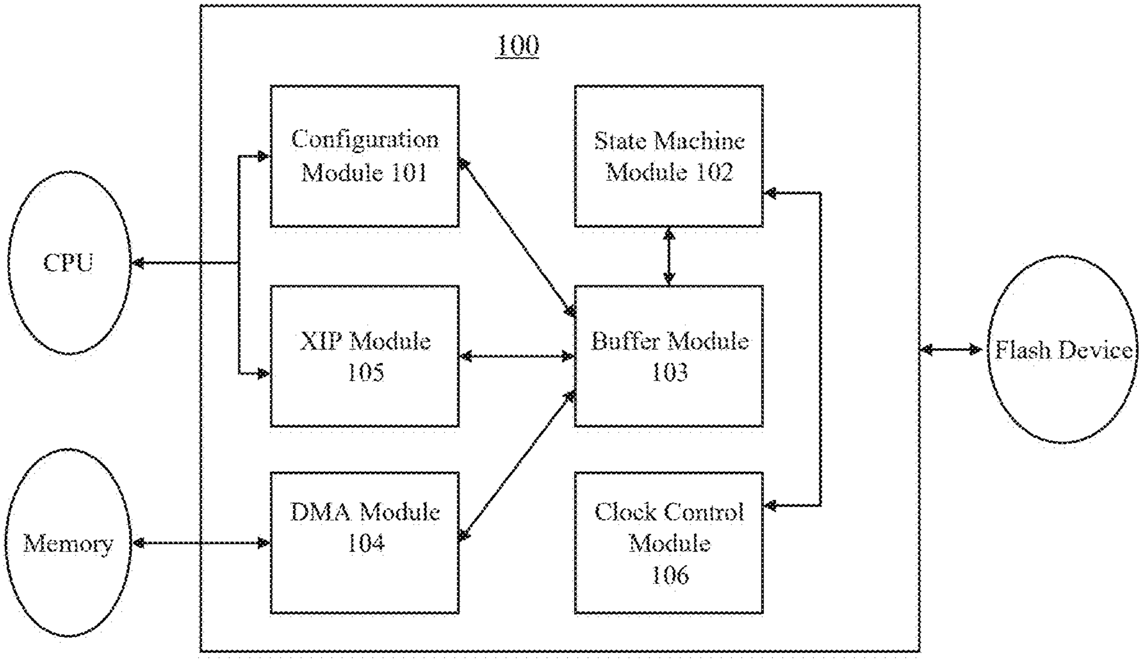
FIG. 6 is a schematic view showing a structure of yet another Flash controller according to an embodiment.

Referring to FIG. 6, FIG. 6 is a schematic view showing a structure of another Flash controller according to an embodiment of the present application. In an embodiment, the Flash controller 100 further includes a clock control module 106. The clock control module 106 is configured to, when executing the target instruction, obtain the shared configuration information and independent configuration information corresponding to the target instruction, so as to, based on the shared configuration information and the independent configuration information corresponding to the target instruction, generate a clock signal that meets requirements of driving the Flash device.

The clock control module 106 is connected to the state machine module 102.

The clock control module 106 is mainly configured to generate the clock signal that meets the requirements of driving the Flash device based on the configuration information of the configuration module 101. Specifically, when executing a target instruction, the clock control module 106 can obtain the configuration information corresponding to the target instruction, which is sent by the state machine module 102, and then based on the configuration information, generate the clock signal corresponding to the target instruction, which meets the requirements of driving the Flash device.

In an embodiment, the state machine module 102 is further configured to generate an extension control signal when the sending buffer space of the buffer module 103 is empty or when the receiving buffer space of the buffer module 103 is full, and send the extension control signal to the clock control module 106. The clock control module 106 is configured to perform a clock extension processing according to the extension control signal.

That is, the clock control module 106 can receive a control of the state machine module 102, and after receiving the extension control signal, needs to perform a clock extension processing to suspend a data interaction.

The clock extension processing refers to keeping a level of a current clock signal unchanged, thereby avoiding the generation of a valid driving or sampling edge.

Figure 7:
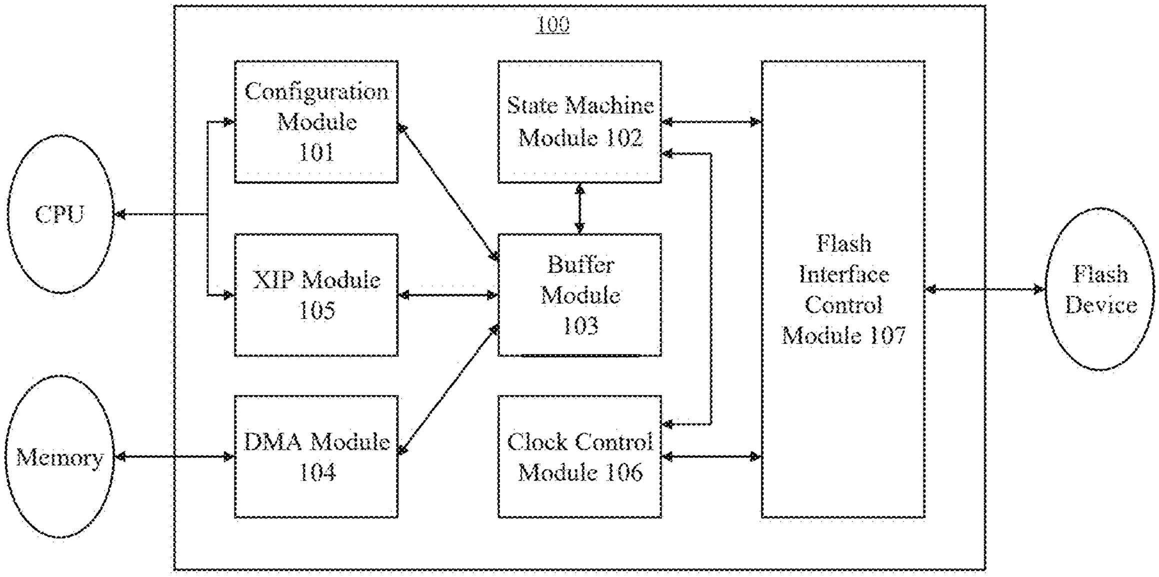
FIG. 7 is a schematic view showing a structure of yet another Flash controller according to an embodiment.

Referring to FIG. 7, FIG. 7 is a schematic view showing a structure of another Flash controller according to an embodiment of the present application. The Flash controller 100 further includes a Flash interface control module 107. The state machine module 102 is specifically configured to, when executing the target instruction, generate a device control signal based on shared configuration information and independent configuration information corresponding to the target instruction, and send the device control signal to the Flash interface control module 107. The clock control module 106 is configured to send a generated clock signal to the Flash interface control module 107. The Flash interface control module 107 is configured to, according to the device control signal and the clock signal and based on the timing requirements of the Flash interface, control the Flash device and perform data interaction with the Flash device.

That is, the Flash interface control module 107 is connected to both the state machine module 102 and the clock control module 106, and the Flash interface control module 107 is connected to an external Flash device. The Flash interface control module 107 can receive signals from the state machine module 102 and clock control module 106, and under the control of the clock signal and the device control signal, controls the Flash device and perform the data interaction with the Flash device according to the timing requirements of the Flash interface.

In other words, the Flash controller 100 performs the data interaction with the Flash device through the Flash interface control module 107.

Since the Flash interface control module 107 directly interacts with the external Flash device connected to the system, the physical layout and wiring of the Flash interface control module 107 need to be strictly performed.

In addition, each module in the Flash controller 100 may be implemented by hardware or by a combination of software and hardware.

For ease of understanding, the high-performance Flash controller provided by the embodiments of the present application is described below in a detailed embodiment. The Flash controller includes: the configuration module, the XIP module, the DMA module, the clock control module, the buffer module, the state machine module, and the Flash interface control module.

The configuration module includes register sets, which are configured to configure the working modes and data transmission modes of the controller and coordinate the data interaction between the CPU and the Flash device. Specifically, the register sets of the configuration module include the shared register set and a configurable quantity of independent register sets, so that the CPU, after performing a configuration one time, can continuously initiate multiple different operations to the Flash device. The shared register set of the configuration module mainly includes the status register, the interrupt enable register, the working mode register, the clock configuration register, the DMA transfer register, the CPU transfer register and the transfer starting register. The configuration information of the shared register is valid for the operations continuously initiated to the Flash device for several times. Each independent register set of the configuration module mainly includes the instruction register, the address register, the mode bit register, the null period register, the data register, the transmission length register, the transmission attribute register and the transmission interval register. An additional independent register set is required for each configuration for the Flash device or for each data interaction with the Flash device.

The XIP module is configured to return the data of the buffer module to CPU, so as to process the CPU's read data request for the Flash device.

The DMA module is configured to write the data from the memory into the buffer module or read the data from the buffer module and write them into the memory, so as to coordinate the data interaction between the memory and the Flash device.

The clock control module is configured to generate the clock signal that meets the requirements of driving the Flash device based on the configuration information of the configuration module.

The buffer module is configured to cache data from the CPU, memory or Flash device, and includes the sending buffer and the receiving buffer.

The state machine module is configured to parse the configuration information of the configuration module to generate the control information and the configuration information for controlling the Flash device, and coordinate the data interaction between the buffer module and the Flash device. The state machine module includes the post-transmission auto-timing logic, which can realize feeding corresponding interrupt status information back to the CPU after the data interaction between the buffer module/data register and the Flash device is completed and after the configured transmission time interval is reached.

The flash interface control module is configured to receive signals from the state machine module and clock control module, and control the Flash device and perform data interaction with the Flash device according to the timing requirements of the Flash interface.

The registers in each corresponding independent register set are configured according to the relevant characteristics of the five phases of each of different operations. Specifically, a phase is started/ended by configuring the transmission attribute register, the length of a phase is defined by configuring the transmission length register, and the instruction/address/mode bit/quantity of null period is defined by configuring the instruction/address/mode bit/null period register, respectively.

In the embodiment of the present application, the transmission interval register in the independent register is configured to define the time interval for reporting the interrupt signal or initiating the next target instruction after the Flash completes the execution of the previous target instruction. The software end can configure the maximum instruction execution time of the erase or program operation in the register.

In the embodiments of the present application, the working modes of the controller are divided into the CPU mode, the DMA mode and the XIP mode. The CPU mode means that the CPU realizes the data interaction with the Flash device through the corresponding registers of the configuration module. The DMA mode means that the DMA module, after receiving the configuration information related to the DMA operation from the configuration module, initiates the DMA operation to perform the data interaction with the Flash device. The XIP mode means that the XIP module, after receiving the configuration information related to the XIP mode from the configuration module, processes the XIP request initiated by the CPU to realize reading data from the Flash device.

The Flash controller of the embodiments of the present application introduces the "single-configuration-and-multiple-transmission" mechanism (in which, after configuring the Flash controller one time, the Flash controller can continuously transfer different configurations to the Flash device for several times and perform data interactions, and only interrupts the CPU once), which can avoid the increase of the CPU overhead and the reduction of the system performance which are caused by the Flash controller frequently interrupting the CPU when completing a series of transmissions. In addition, the Flash controller of the embodiments of the present application introduces the "post-transmission auto-timing" mechanism (in which, after executing a certain instruction for the Flash device and pulling up the chip select signal, the Flash controller internally times and reports an interrupt signal to the CPU automatically only when the configured threshold is reached), thereby avoiding the increase of the CPU overhead caused by the CPU determining whether an execution of a certain operation on the Flash is completed by means of internally timing or periodically monitoring the status bits of the Flash, and thereby improving the system performance.

Based on the same inventive concept, an embodiment of the present application further provides an embedded system including the Flash controller above. Since the implementation solutions provided by the embedded system for solving the problem are similar to the implementation solutions described in the related embodiments of the Flash controller above, for the specific limitations in one or more embodiments of the embedded system below, reference may be made to the above-mentioned limitations on the Flash controller, which will not be repeated described herein.

In an embodiment, an embedded system is provided. The embedded system includes a CPU, a memory device, a Flash device, and the Flash controller of any one of the above embodiments connected to the CPU, the memory device, and the Flash device.

It should be understood for those skilled in the art that the structural views shown in the above embodiment are merely block diagrams of part of the structure related to the solutions of the present application and do not constitute specific limitations on the structure of the Flash controller in the present application. The specific structure of the Flash controller may include more or fewer components than those shown in the figures, or may combine certain components, or may have a different arrangement of components.

The technical features of the above-described embodiments may be arbitrarily combined. To make the description concise, not all possible combinations of the technical features in the above-described embodiments are described. However, as long as there is no contradiction in the combinations of these technical features, these combinations should be considered to be within the scope of this specification.

The above-described embodiments are only several implementation methods of the present application. The descriptions thereof are relatively specific and detailed, but cannot be construed as limiting the scope of the patent application. It should be noted that, for a person of ordinary skill in the art, several variations and improvements may be made without departing from the concept of the present application, and all variations and improvements belong to the protection scope of the present application. Therefore, the protection scope of the patent application shall be subject to the appended claims.

The invention claimed is:

1. A Flash controller, comprising a configuration circuit and a state machine circuit, wherein the configuration circuit comprises a shared register set and multiple independent register sets;

the configuration circuit is configured to: receive shared configuration information and multiple sets of independent configuration information sent by a central processing unit (CPU) corresponding to a target operation, and configure each register in the shared register set according to the shared configuration information, and configure each register in each independent register set according to each set of independent configuration information; wherein the shared configuration information is configuration information shared for executing multiple target instructions related to the target operation, and each set of independent configuration information is configuration information used separately for executing each target instruction; and the state machine circuit comprises a shift register configured for performing a shift operation on data in each processing phase and is configured to: obtain the shared configuration information and the multiple sets of independent configuration information from the configuration circuit, and control the Flash controller to execute the multiple target instructions in sequence according to the shared configuration information and the multiple sets of independent configuration information to initiate the target operation to a Flash device, and send an interrupt signal to the CPU through the configuration circuit automatically when an execution of the last target instruction is completed.

2. The Flash controller according to claim 1, wherein each independent register set comprises a transmission interval register; each set of independent configuration information comprises a transmission time interval for configuring the transmission interval register; and the transmission time interval is a time interval between the Flash device completing executing a previous target instruction and an issue of a next target instruction; and the state machine circuit is specifically configured to: time the transmission time interval in the transmission interval register corresponding to the execution of the last target instruction after the Flash device completes executing the last target instruction, and determine that the execution of the last target instruction is completed after completing timing and send an interrupt signal to the CPU through the configuration circuit.

3. The Flash controller according to claim 2, wherein each transmission time interval is a preset maximum instruction execution time duration.

4. The Flash controller according to claim 2, wherein processing phases of the target instruction comprise an instruction phase, an address phase, a mode bit phase, a null period phase and a data phase; each independent register set further comprises a transmission attribute register, a transmission length register, an instruction register, an address register, a mode bit register and a null period register;

the transmission attribute register is configured to start or end each processing phase;

the transmission length register is configured to define a length of each processing phase;

the instruction register is configured to define each target instruction;

the address register is configured to define an address for operating the Flash device;

the mode bit register is configured to define a mode bit for operating the Flash device; and the null period register is configured to define a quantity of null periods for operating the Flash device.

5. The Flash controller according to claim 2, wherein each independent register set further comprises a data register; and the Flash controller is configured to write first interactive data in the data register into the Flash device, or write second interactive data read from the Flash device into the data register for storage.

6. The Flash controller according to claim 1, wherein the Flash controller further comprises a buffer module; the shared register set comprises a CPU transfer register; a working mode of the Flash controller comprises a CPU mode; and in the CPU mode, the configuration circuit is configured to write third interactive data, which are sent by the CPU to the CPU transfer register, into the buffer module, and configured to obtain fourth interactive data from the buffer module, which are read from the Flash device, and send the fourth interactive data to the CPU.

7. The Flash controller according to claim 6, wherein the Flash controller further comprises a Direct Memory Access (DMA) circuit connected to an external memory device; the working mode of the Flash controller further comprises a DMA mode;

in the DMA mode, the DMA circuit is configured to obtain DMA configuration information related to a DMA operation from the configuration circuit to initiate the DMA operation based on the DMA configuration information; the DMA operation comprises: obtaining fifth interactive data from the buffer module read from the Flash device, and writing the fifth interactive data into the external memory device, or reading sixth interactive data in the external memory device and writing the sixth interactive data into the buffer module.

8. The Flash controller according to claim 6, wherein the Flash controller further comprises an Executed in Place (XIP) circuit; the working mode of the Flash controller further comprises an XIP mode;

in the XIP mode, the XIP circuit is configured to receive an XIP request sent by the CPU, and obtain XIP configuration information related to the XIP mode from the configuration circuit, and process the XIP request based on the XIP configuration information, and obtain seven interactive data from the buffer module read from the Flash device, and return the seven interactive data to the CPU.

9. The Flash controller according to claim 1, wherein the Flash controller further comprises a clock control circuit connected to the state machine circuit;

the clock control circuit is configured to, when executing each target instruction, obtain the shared configuration information and independent configuration information corresponding to each target instruction, and generate a clock signal meeting requirements of driving the Flash device based on the shared configuration information and the independent configuration information corresponding to each target instruction sent by the state machine circuit.

10. The Flash controller according to claim 9, wherein the Flash controller further comprises a buffer module;

the state machine circuit is further configured to generate an extension control signal when a sending buffer space of the buffer module is empty or when a receiving buffer space of the buffer module is full, and send the extension control signal to the clock control circuit; and the clock control circuit is configured to perform a clock extension processing according to the extension control signal, wherein the clock extension processing refers to keeping a level of a current clock signal unchanged.

11. The Flash controller according to claim 9, wherein the Flash controller further comprises a Flash interface control circuit, connected to the state machine circuit and the clock control circuit;

the state machine circuit is specifically configured to, when executing each target instruction, generate a device control signal based on shared configuration information and independent configuration information corresponding to each target instruction, and send the device control signal to the Flash interface control circuit;

the clock control circuit is configured to send a generated clock signal to the Flash interface control circuit; and the Flash interface control circuit is configured to control the Flash device and perform data interaction with the Flash device, according to the device control signal and the clock signal and based on timing requirements of the Flash interface.

12. The Flash controller according to claim 2, wherein transmission time intervals in the multiple sets of independent configuration information corresponding to the multiple target instructions are different.

13. The Flash controller according to claim 3, wherein maximum instruction execution time durations corresponding to different target instructions are different.

14. The Flash controller according to claim 6, wherein the shared register set further comprises a status register, an interrupt enable register, an operating mode register, a clock configuration register, a DMA transfer register and a transfer starting register.

15. The Flash controller according to claim 6, wherein the buffer module comprises a transmission buffer area and a receiving buffer area;

the transmission buffer area is configured to cache data to be written into the Flash device; and the receiving buffer area is configured to cache data read from the Flash device.

16. The Flash controller according to claim 1, wherein the Flash controller is configured to support a 1-line, 2-line, 4-line or 8-line operation on the Flash device.

17. The Flash controller according to claim 1, wherein the state machine circuit comprises an idle state, an instruction state, an address state, a mode bit state, a null period state and a data state.

18. The Flash controller according to claim 1, wherein the amount of interactive data with the Flash device at one time does not exceed 4 bytes.

19. An embedded system, comprising the CPU, a memory device, the Flash device, and the Flash controller according to claim 1 connected to the CPU, the memory device and the Flash device.

* * * * *